No. 825,759. PATENTED JULY 10, 1906.
R. M. RUCK.
VARIABLE SPEED DRIVING MECHANISM.
APPLICATION FILED APR. 9, 1906.

WITNESSES.
W. M. Avery
A. C. Davis

INVENTOR
Richard Matthews Ruck
BY Munn & Co
ATTORNEYS

UNITED STATES PATENT OFFICE.

RICHARD MATTHEWS RUCK, OF LONDON, ENGLAND.

VARIABLE-SPEED DRIVING MECHANISM.

No. 825,759.

Specification of Letters Patent.

Patented July 10, 1906.

Application filed April 9, 1906. Serial No. 310,697.

*To all whom it may concern:*

Be it known that I, RICHARD MATTHEWS RUCK, a subject of the King of Great Britain, residing at 44 Thurloe Square, South Kensington, London, England, have invented certain new and useful Improvements in Variable-Speed Driving Mechanism, of which the following is a specification.

This invention relates to that type of variable-speed driving mechanism which is described in an application for Letters Patent of even date herewith and having Serial No. 310,696, and the object of which is to combine the advantages (with regard to positive driving and graduated alteration of speed ratio) and avoid the disadvantages (with regard to shock and slip) incidental to the use of toothed wheel-gearing and of conoidal friction-pulley variable-speed mechanism, respectively.

Driving mechanism of the type referred to consists, essentially, in the combination of a so-called "toothed" cone constituted by a series of juxtaposed toothed rings mounted to turn as one about a common axis, successive rings having progressively-varying numbers of teeth of equal pitch and one tooth of all the rings being alined to form a row lying in one plane passing through the common axis of the rings, a shaft journaled to rotate in bearings in the same plane with the axis and parallel to the bounding-surface of the cone, a toothed pinion splined upon said shaft and adapted to gear with the several toothed rings of the cone alternatively, and means for enabling said pinion to be moved along the shaft in either direction step by step, so as to pass out of gear with one ring and into gear with an adjacent ring of teeth of the cone at those moments only when the row of alined teeth is brought into the common plane of the axes of the cone and shaft.

The principal object of the present invention is to provide means for enabling the pinion member of the mechanism to be shifted lengthwise of the cone by hand under automatically-acting control instead of by automatically-actuated mechanism under manual control, as described in the previous application of even date herewith.

The invention will be described with reference to the accompanying drawings, wherein—

Figure 2:
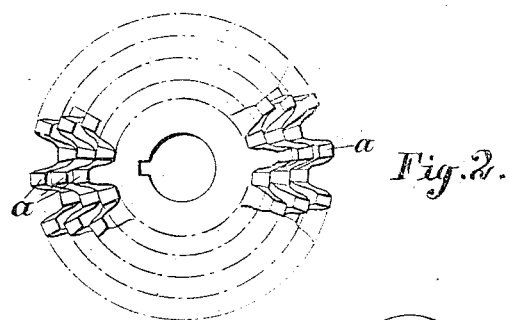
Figure 1:
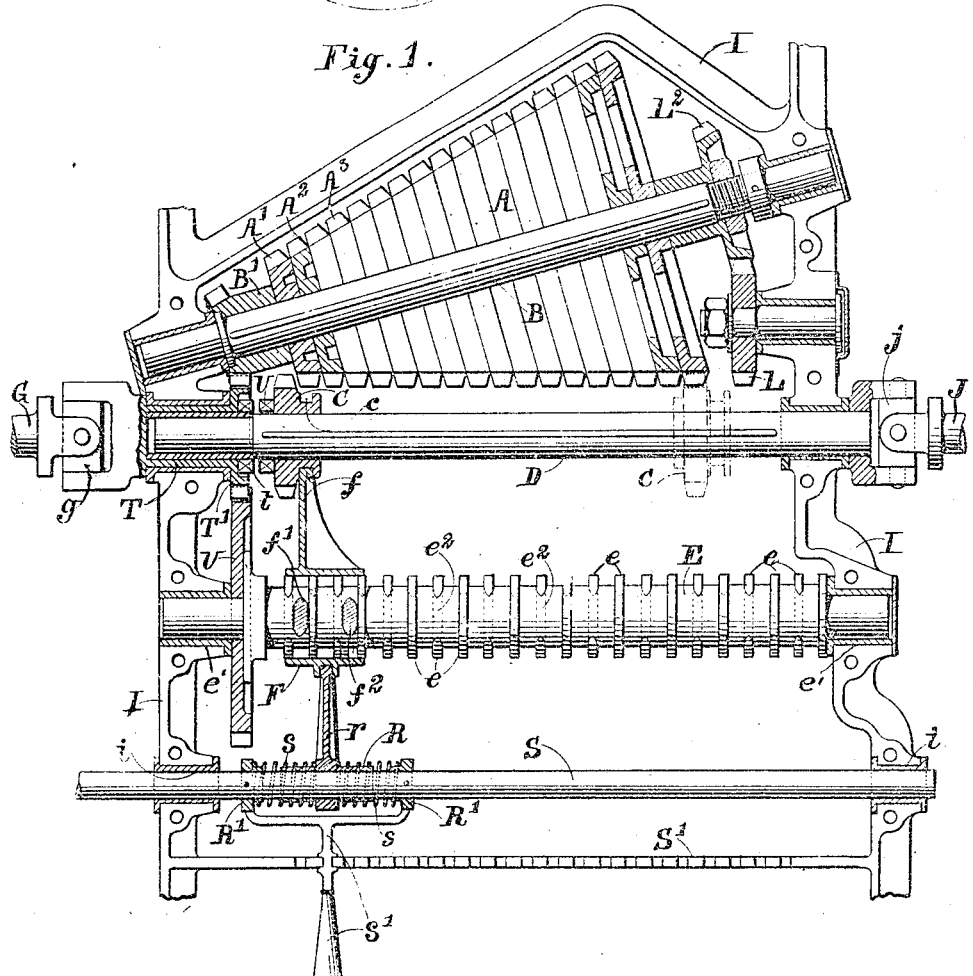

Figure 1 represents, in sectional plan view, a form of the improved variable-speed driving-gear designed specially for use on motor-cars. Fig. 2 is a partial end view of a so-called toothed "cone."

One member of the variable-speed mechanism consists of a series $A'$ $A^2$ $A^3$ &c., of rings of teeth fixed side by side upon a shaft B, successive rings having progressively-varying numbers of teeth of equal pitch and the diameters of successive rings $A'$ $A^2$ $A^3$, &c., consequently varying progressively, so that the series of rings together constitute what may be termed a "toothed" cone A. The other member of the variable-speed mechanism consists of a toothed pinion C, having teeth adapted to gear with those of the so-called "cone," this pinion being splined upon a shaft D, which lies in the same plane with the shaft B of the cone, parallel to the bounding-surface of the latter and at such a distance therefrom that the pinion by being moved in the direction of its own axis may be brought successively into gear with all the rings of teeth constituting the cone. Hence motion may be transmitted between the members A and C of the variable-speed mechanism in any speed ratio corresponding to the ratio between the number of teeth in the pinion C and the number in any one of the rings of teeth constituting the cone A, according to the position for the time being of the pinion lengthwise of the cone.

In order that the pinion C may be so moved along its shaft D as to be brought into gear with successive rings of teeth on the cone while both members A and C of the gear are rotating, the rings of teeth constituting the cone are arranged in such angular relation to one another about their common axis that (as indicated in Fig. 2) all the rings have one tooth $a$ (or space between two adjacent teeth) alined in a row which lies in one plane passing through the axis of the cone, so that when during the revolution of the cone said plane coincides with the plane wherein the axes of the cone A and pinion C both lie the pinion may without shock be moved out of gear with that ring of teeth with which it is then in engagement and into gear with either of the rings adjacent to said ring. The arrangement thus permits of the pinion being momentarily in gear with two adjacent rings of teeth at one and the same time instead of necessitating the pinion being thrown entirely out of gear with one ring before being thrown into gear with another. Hence successive rings of teeth may be closely juxtaposed, as shown, and the movement wherebthe pinion is shifted lengthwise of the cone in order to alter the ratio of the gearing, although in reality intermittent, has almost the smooth character proper to unbroken continuity.

By the present invention means are provided whereby on pressure being applied by hand in order to cause the pinion C to move lengthwise of the cone A the movement of the pinion will be automatically controlled in such manner that the actual shifting of the pinion in either direction can take place only step by step at those moments when a row of alined teeth $a$ (or of grooves between two teeth) on the cone is brought into the common plane of the axes of the cone A and shaft D, each such step-by-step movement of the pinion C being limited to a distance equal to the breadth of a single ring of teeth of the cone, so that although the actual shifting of the pinion is performed by hand the amplitude of the shifting movement will be constant and of the definite extent required. For this purpose the hub of the pinion C has a peripheral groove $c$, which is engaged by a fork $f$, carried by a slide fitted to work to and fro over a series of collars $e$ upon a shaft E, which is journaled in bearings $e'$, parallel to the pinion-shaft D. The distance apart of the collars $e$ is equal to that of the rings of teeth on the cone A, and each collar extends in a plane perpendicular to the axis of the shaft E. The latter is driven continuously in one direction at a constant speed, bearing a definite ratio to that at which the cone A rotates, and the collars $e$ are provided, as at $e^2$, with gaps bounded by knife-edges and adapted to give passage to knife-edged studs $f'$ $f^2$, carried by and projecting inwardly from the slide F, the speed ratio between the cone A and shaft D being so adjusted that each time a row of alined teeth $a$ on the cone is brought into the common plane of the axes of the cone A and pinion-shaft D a gap $e^2$ will be brought into registration with each of the studs $f'$ $f^2$, and consequently the slide F will be free to be moved lengthwise of the shaft E.

The studs $f'$ $f^2$ fit between the collars $e$, so that, excepting at the moments referred to, the slide F is held securely against movement lengthwise of the shaft E.

It will be obvious that any convenient number of studs, such as $f'$ $f^2$, may be employed, provided they are so placed as to be simultaneously in registration with gaps $e^2$ in the corresponding collars.

The gaps $e^2$ in successive collars are not in alinement with one another, but occupy different angular positions about the axis of the collar-shaft E, so that each time a row of alined teeth $a$ on the cone is brought into the common plane of the axes of the cone A and pinion-shaft D the extent to which the slide F and pinion C can be moved is only equal to the distance from center to center of the width of two adjacent rings of teeth on the cone. In the example illustrated the gaps $e^2$ in successive collars $e$ are situated alternately at opposite ends of a diameter of the shaft E, which must therefore make one-half of a revolution while the cone A rotates through the angular interval separating two rows of alined teeth $a$.

The means for moving the slide F by hand lengthwise of the collar-shaft E are as follows: The slide F is connected by an arm $r$ with a sleeve R, slidable upon a rod S, parallel to the shaft E and itself capable of being slid (through bearings $i$ in the frame I) in the direction of its own axis to a distance equal to the entire range of movement of the slide F lengthwise of shaft E. The rod S has fixed upon it beyond each end of the sleeve R a collar R', between which and the corresponding end of the sleeve is interposed a spring $s$, so that the sleeve R if slid along the rod S in either direction will tend to return to a position midway between the collars R'. Attached to the rod S is a handle $s'$, adapted to engage under gravity or spring-pressure in any one of a series of notches in a rack S', extending parallel with the rod S, the distance apart of the notches corresponding to that of the collars $e$ on the shaft E, so that the handle when engaged with the rack will lock the pinion C against movement lengthwise of the cone A, the position of the handle serving also to indicate the position of the pinion relatively to the cone.

Suppose now that it is desired to shift the pinion C along the cone A from one ring of teeth to the next adjacent ring. The handle $s'$ is lifted out of that notch in the bar S' with which it has been resting in engagement and is moved into engagement with the next notch in the required direction, carrying along with it the rod S and collars R'. If at the instant when this movement is performed the gaps $e^2$ in the collars $e$ happen to register with the studs $f'$ $f^2$, the slide F will be at once moved to the required extent; otherwise the collars $e$ will engage the studs and obstruct the movement of the slide, and therefore compression of one or other of the springs $s$ will be produced until registration of the gaps $e^2$ with the studs $f'$ $f^2$ is brought about by the rotation of the shaft E, whereupon that one of the springs $s$ which had been compressed by the movement of the handle $s'$ and collars R' relatively to the sleeve R will come suddenly into action and will shoot the sleeve along the rod S, so as to move the slide F suddenly to the extent of one step along the shaft E, carrying the pinion C at the same time one complete step along the cone A. Should a stud in passing through a gap $e^2$ be struck by the collar, the knife-edges will prevent the occurrence of jamming.

Only so much clearance need be allowed between the ends of the sleeve R and the respective collars R' as will permit of the handle s' and rod S being moved a single step at one time. So long, however, as the pressure of the hand is applied to the handle s' in either direction the step-by-step travel of the pinion C will proceed continuously within the limits of length of the collar-shaft E, the use of the rack S' not being essential.

In the arrangement illustrated, which, as already stated, shows a form of the improved driving-gear designed specially for use on motor-cars, the pinion-shaft D is driven direct from the motor-shaft J through the universal joint j, and motion is therefore conveyed from shaft D to the cone A through the pinion C at variable speed, the cone-shaft B driving the Cardan shaft G through a sleeve T, turning upon the corresponding end of shaft D in a bearing in the frame I and coupled to the Cardan shaft through a universal joint g. Fast upon the sleeve T is a wheel T' constantly in gear with a pinion B', fast on the cone-shaft B, and also in gear with a wheel U, fast on the shaft E, so that the shafts G and E are both driven at speeds proportionate to that of the cone A.

The pinion C may be moved out of gear with the cone A at either end of the latter, so as to enable the driving of the Cardan shaft G to be stopped without any preliminary graduation of speed when running at either the extreme highest or lowest speed. The pinion C when slid in the direction of the larger end of the cone A beyond the position of no gear is thrown into gear with an idle wheel L, constantly in gear with a wheel L², fast on the cone-shaft B, so as to cause the cone to be driven in the reverse direction, but only at a single speed. When the pinion C is slid in the direction of the smaller end of the cone beyond the position of no gear, a set of clutch-teeth v, carried by the pinion, are caused to engage with corresponding clutch-teeth t on the end of the sleeve T, with the result that the shaft D is coupled directly to the sleeve T, and thus motion will be transmitted from the motor-shaft J to the Cardan shaft G without the intervention of the variable-speed gear.

I claim—

1. The combination with variable-speed driving mechanism consisting of a so-called toothed cone constituted by a series of juxtaposed toothed rings mounted to turn as one about a common axis, successive rings having progressively-varying numbers of teeth of equal pitch and one tooth of all the rings being alined to form a row lying in one plane passing through the common axis of the rings; a shaft journaled to rotate in the same plane with the axis and parallel to the bounding-surface of the cone; and a toothed pinion splined upon said shaft and adapted to gear with the several toothed rings of the cone alternatively; of means for enabling the pinion to be brought manually into gear with the several toothed rings in succession while the cone and pinion are both rotating; said means consisting essentially of a member actuated in time with the revolutions of the cone and adapted to permit successive movements of the pinion in either direction lengthwise of its axis to an extent equal to the distance apart of successive rings of teeth, only at those moments when a row of alined teeth on the cone is brought into the common plane of the axes of the cone and pinion; and means for applying yielding pressure to the pinion in either direction lengthwise of its axis, substantially as specified.

2. Variable-speed driving mechanism consisting in the combination with a so-called toothed cone constituted by a series of juxtaposed toothed rings mounted to turn as one about a common axis, successive rings having progressively-varying numbers of teeth of equal pitch and one tooth of all the rings being alined to form a row lying in one plane passing through the common axis of the rings; a shaft journaled to rotate in the same plane with the axis and parallel to the bounding-surface of the cone and a toothed pinion splined upon said shaft and adapted to gear with the several toothed rings of the cone alternatively; of a shaft journaled in bearings parallel to the axis of said pinion; a series of gapped collars on said shaft, spaced apart at distances equal to the distance apart of the toothed rings of the cone; a slide coupled to said pinion and fitted to work to and fro over said collars; a stud carried by said slide adapted to engage between said collars and to pass through the gaps therein; gearing for rotating the collar-carrying shaft continuously in one direction at such speed relatively to that of the cone as to cause the gaps in the collars to be brought into registration with said stud only when a row of alined teeth in all the rings of the cone are brought into the common plane of the axes of the cone and pinion; and means for applying yielding pressure to said slide in either direction lengthwise of the collar-carrying shaft, substantially as specified.

3. Variable-speed driving mechanism consisting of a so-called toothed cone constituted by a series of juxtaposed toothed rings mounted to turn as one about a common axis, successive rings having progressively-varying numbers of teeth of equal pitch and one tooth of all the rings being alined to form a row lying in one plane passing through the common axis of the rings; a shaft journaled to rotate in the same plane with the axis and parallel to the bounding-surface of the cone; a toothed pinion splined upon said shaft and adapted to gear with the several toothed rings of the cone alternatively; a member actuated in time with the revolutions of the cone and adapted to permit successive movements of the pinion in either direction lengthwise of its axis to an extent equal to the distance apart of successive rings of teeth, only at those moments when a row of alined teeth on the cone is brought into the common plane of the axes of the cone and pinion; a member provided with a handle and mounted to slide parallel to the axis of the pinion; a sleeve connected to the last-mentioned member and coupled to the pinion; there being shoulders on said member beyond each and of the sleeve; springs interposed between the sleeve and the respective shoulders; a handle attached to said member; and a stationary rack-bar mounted parallel to the axis of the pinion and adapted to interlock with said handle so as to retain said member in the position to which it may have been moved, substantially as specified.

RICHARD MATTHEWS RUCK.

Witnesses:
GEORGE ERNEST MINTERN,
WALTER J. SKERTEN.